(12) United States Patent
Stevens

(10) Patent No.: US 8,542,976 B2
(45) Date of Patent: Sep. 24, 2013

(54) TIME-SHIFT BUFFER

(75) Inventor: J. Clarke Stevens, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 612 days.

(21) Appl. No.: 12/826,854

(22) Filed: Jun. 30, 2010

(65) Prior Publication Data

US 2012/0008912 A1  Jan. 12, 2012

(51) Int. Cl.
*H04N 5/76* (2006.01)
(52) U.S. Cl.
USPC ......... 386/237; 386/347; 386/E5.003; 725/94

(58) Field of Classification Search
USPC .............. 386/237, 347, E5.003; 725/94
See application file for complete search history.

(56) References Cited

U.S. PATENT DOCUMENTS

2005/0183120 A1 * 8/2005 Jain et al. .................... 725/46

* cited by examiner

*Primary Examiner* — Gelek W Topgyal
*Assistant Examiner* — Girumsew Wendmagegn
(74) *Attorney, Agent, or Firm* — Great Lakes Intellectual Property, PLLC

(57) ABSTRACT

A method and system is disclosed for time-shifted access to media content. The time-shifted access may be facilitate with a time-shift buffer and the use of time-shift buffers to mark periods in time from which time-shifted access is to be begin according to triggering events registered at output devices being used to facilitate the time-shifted access.

17 Claims, 2 Drawing Sheets

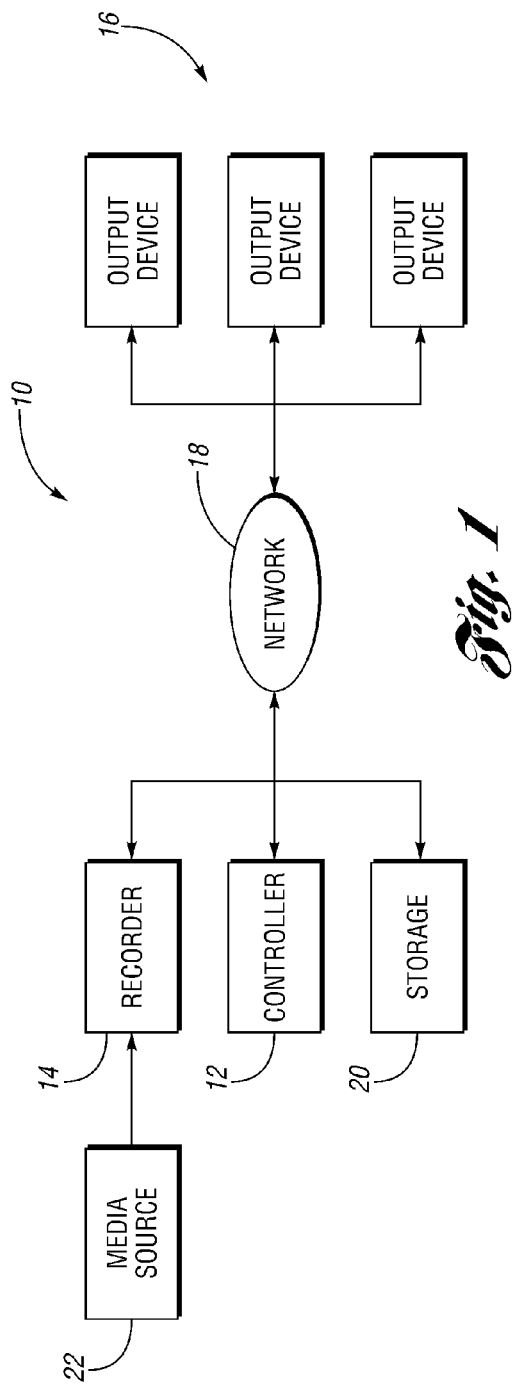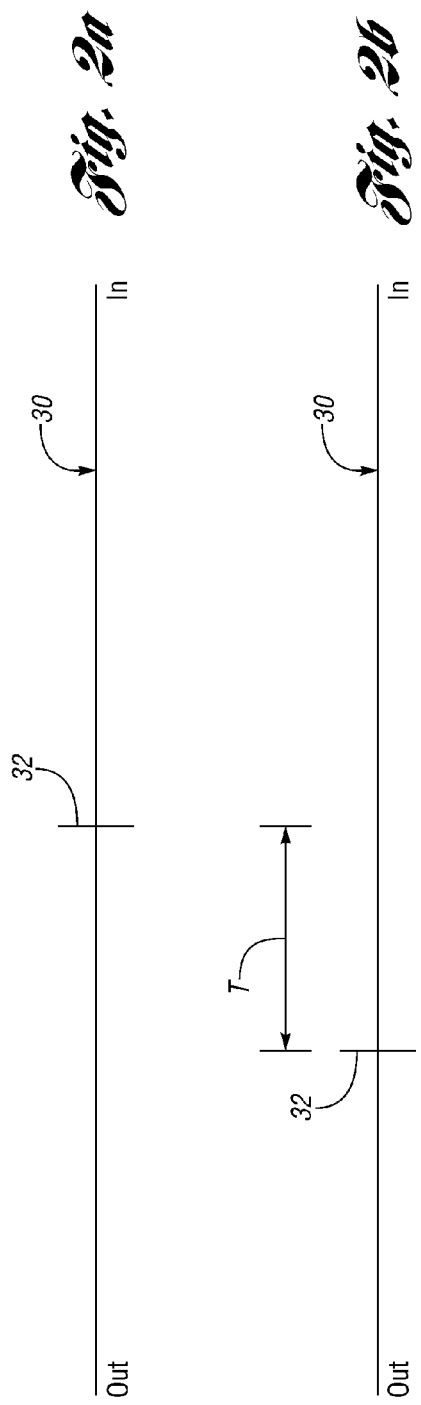

TIME-SHIFT BUFFER

TECHNICAL FIELD

The present invention relates to time-shift buffers, such as but not limited to time-shift buffers operable to support time-shifted playback of media content.

BACKGROUND

There are numerous recording devices capable of recording media content for subsequent playback, such as but not limited to digital video recorders (DVRs). The playback of media content from such recording devices may be considered to be time-shifted since it occurs after transmission of the media content to the recording device.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a system operable to facilitate time-shifted playback of media content in accordance with one non-limiting aspect of the present invention;

FIGS. 2a-2b schematically illustrate operation of a time-shift buffer in accordance with one non-limiting aspect of the present invention.

DETAILED DESCRIPTION

Figure 3:
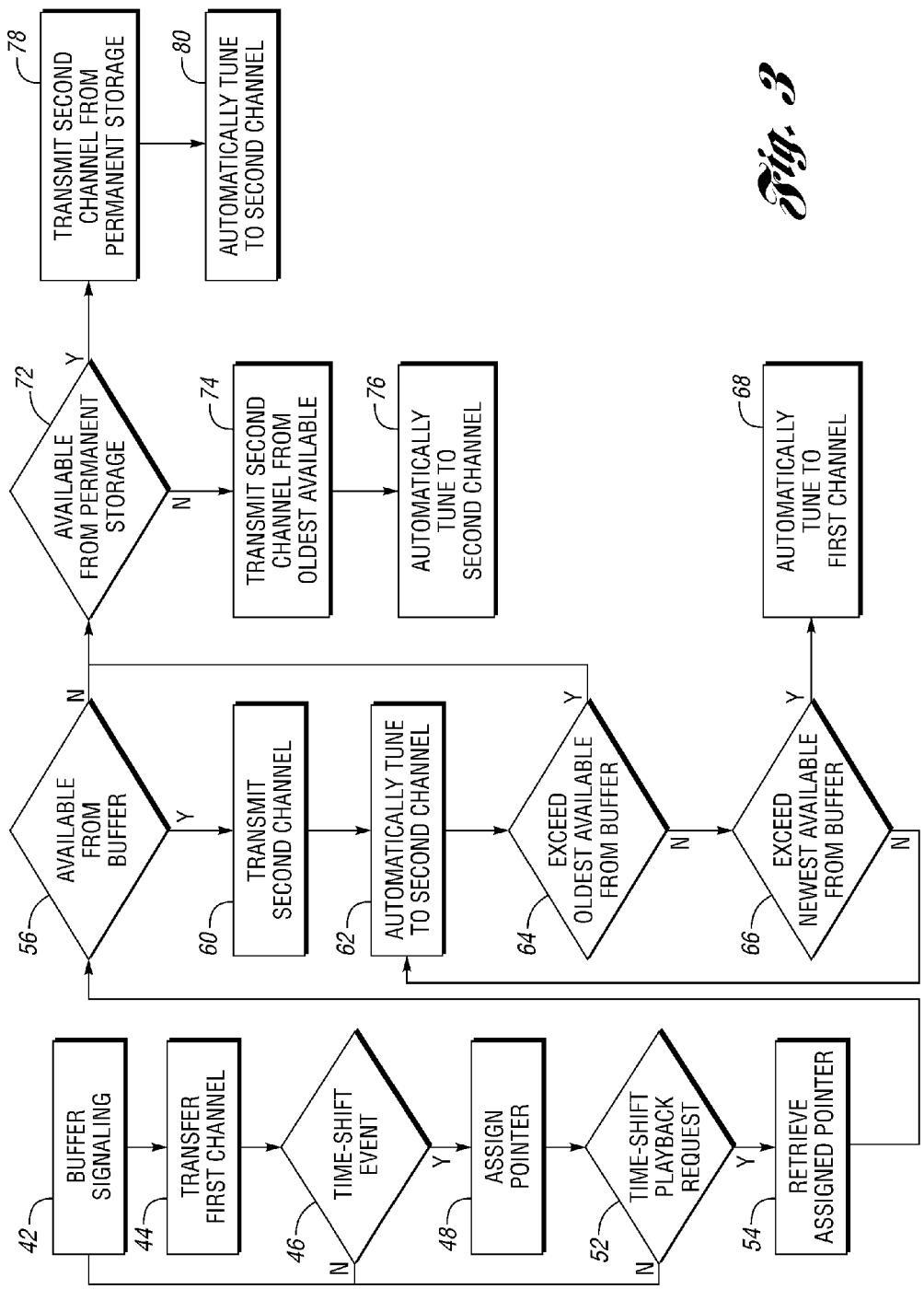
FIG. 3 illustrates a flowchart of a method for facilitating time-shifted playback in accordance with one non-limiting aspect of the present invention.

FIG. 1 illustrates a system 10 operable to facilitate time-shifted playback of media content in accordance with one non-limiting aspect of the present invention. The system 10 includes a controller 12 operable to facilitate transmission of recorded media content from a recorder 14 to a plurality of output devices 16 with signaling carried over a wireless or wireline network 18. The recorder 14 may be considered to be a temporary memory location in that it buffers media content for a prescribed period of time. In the event more long term storage of the media content is desired, the recorded media content may be transferred to a more permanent storage memory 20. While separate elements are shown, one or more of the elements may be included in the same unit or the operations associated therewith may be otherwise integrated, such as by having the temporary and permanent storage locations 14, 20 on a single disc.

The media content buffered on the recorder 14 may relate to any type of electronically transferable media content. The media content may be transferred to the recorder 14 from a media source 22, such as but not limited to a television, radio, or data broadcasting source, and/or the media content may be transferred to the recorder 14 from one or more of the output devices 16. The present invention is predominantly described with respect to the media content being that associated with a television service provider, and more particularly, with the use of the recorder 14 to record signaling associated with a television channel broadcasted by the television source 22. The description of the present invention with respect to supporting time-shifted playback of television programs is not, unless otherwise noted, intended to limit the scope and contemplation of the present invention. The present invention applies to any time-shifted playback of media content and not just television related media content.

The output devices 16 may be any type of output device capable of processing electronic signaling used to carry the media content for output directly to a user or indirectly to some other device for output to the user, such as but not limited to a mobile device, computer, television and settop box (STB). The recorder 14 may be a single or multi-disc recorder having one or more read/write heads. The media content read from the disc may be transmitted in separate signaling streams to one or more of the output devices 16, optionally with one or more of the output devices receiving multiple signaling streams. The signaling streams may be IP type signaling streams identifiable with an IP address or URL, MPEG based signaling streams identifiable at a designate frequency or channel number (the output device may include a tuner), FDMA or CDMA based signaling used by cellular phone network, satellite, WiMax, or other transmission networks yet to be developed.

The recorder 14 may be located within a home of a subscriber and/or elsewhere, such as at a headend location of a cable television service provider or other remote location of non-cable television service providers. Each recorder 14 may be associated with one or more users, and optionally with one more output devices 16, such that dedicated recording may be performed. In the case of supporting recording of television channels, multiple recorders, or multiple discs included within a common recorder, may be dedicated to specific television channels. Rather than being assigned to output devices 16 or users, the discs may be assigned to specific television channels and processing of time-shifted playback requests for that channel.

The one disc per television channel arrangement contemplated by one non-limiting aspect of the present invention may be beneficial in allowing time-shifted playback of any one of a number of television channels to any number of output devices 16. Rather than requiring the output devices 16 to make a recording request or to otherwise identify channels or programs for recording, the television channels may be automatically buffered on a continuous basis regardless of any requests for time-shifted playback. The one disc per television channel arrangement also eliminates the need to record or otherwise separately or redundantly buffer the same media content for multiple output devices 16. The buffered content may be transmitted from the recorder 14 in real-time over one of television channels or other signaling streams. In this manner multiple live television programs, such as but not limited to a national broadcast of live events, may be buffered by the recorder 14 and transmitted over identified television channels to multiple output devices 16 in different geographical areas.

The output devices 16 may each commonly tune to a first television channel to watch one of live events, such as a sporting event in real-time. In the event one or more of the output devices 16 makes a request for time-shifted playback of the sporting event, the disc buffering the corresponding signaling may begin to transmit corresponding time-shifted signaling to one or more of the requesting output devices 16 over a second television channel, including a VOD channel. If multiple requests are received at different times or for different types of time-shifted playback of the same television channel, additional television channels may be used to transmit the corresponding signaling. Optionally, the television channels used to support the time-shifted playback may be created after receiving the corresponding time-shifted playback request. This can conserve bandwidth and/or system resources.

A single head of the disc may read at speeds sufficient to support transmitting the buffered signal to multiple output devices 16 over the second and additional television channels while at the same time supporting transmission of the live signaling of the first television channel. The single head may read portions of the signaling needed for each television channel at rates faster than the signaling can be output for viewing such that portions of each television channel are read and transmitted at different times without disrupting the viewing experience. In this manner, the signaling for each television channel may be read from a single disc at non-overlapping intervals of time since the single head cannot read different portions of the disc at the same time. Of course, the recorder 14 may include multiple heads operable to read different portions of the same disc and/or to otherwise support simultaneous transmission of television channels.

FIGS. 2a-2b schematically illustrate the recorder 14 being operated as a time-shift buffer for a television channel in accordance with one non-limiting aspect of the present invention. The time-shift buffering may be performed in a circular manner where an incoming television channel or signal stream 30, such as that transmitted from the source 22 supporting the national broadcast of the live sporting event, is buffered on the disc for a predefined period of time before being replace with new signaling. This type of continuous buffering may be executed in a first-in-first-out (FIFO) manner where incoming signaling pushes out previously buffered signaling. A time shift pointer 32 is shown to represent time-based movement of signaling through the buffer where the pointer travels leftwardly an amount of equal to a period T elapsing since placement of the pointer and the receipt of new, incoming signaling.

FIG. 3 illustrates a flowchart 40 of a method for facilitating time-shifted playback in accordance with one non-limiting aspect of the present invention. The method is described with respect to facilitating time-shifted playback of a television channel where a single disc is assigned to continuously buffer the television channel and to service time-shifted playback requests for multiple output devices. While the method is described with respect to a single television channel, the present invention fully contemplates scaling the method to similarly support buffering and time-shifted playback of multiple television channels or other types of non-television signaling streams where the signaling of each channel/stream is buffered with dedicated discs and/or multiple discs.

Block 42 relates to buffering signaling associated with a first television channel on a first disc or other device having capabilities to receive incoming signaling and to output one or more signaling streams. A controller or other logically executing element may monitor the incoming signaling and coordinate the operation necessary to support transmission of the first television channel and transmission of other television channels needed to support time-shifted playback. The television program or other content to be carried with the signaling of the first television channel may be sourced from a content provider, such as but not limited to a studio or network television channel, and/or from one or more of the media devices, and accessed by the output devices tuning to a channel number of other designation indicating a location of the first television channel.

Block 44 relates to transmitting the first television channel in real-time. The real-time transmission may occur almost instantly upon receipt of the signaling from the content source while the incoming signaling is being buffered to the disc. In the event a single head is used to read and write data to the disc, the reading and writing necessary to support buffering and transmission of the first television stream may occur at speeds sufficient to support real-time viewing of the television program. The transmission of the first television channel may continue through program changes and other content variations as long as signaling is still being received from the content source or in the event new signaling desired to be transmitted over the first television channel is switched from another content source.

Block 46 relates to monitoring for a time-shift event. The time-shift event corresponds with any event initiated by one of the output devices to reflect a potential or upcoming need for time-shift playback. One time-shift event may correspond with tuning away from the first television channels, e.g., if one of the output devices is tuned to the first television channel, optionally for at least a predefined period of time (e.g., fifteen seconds). Another time-shift event may correspond with one of the output devices tuning to the first television channel for the first time. Other time-shift events may include the output device receiving a request to pause, rewind, fast forward, or slow motion play the first television channel.

Block 48 relates to assigning a time-shift point to each of the time-shift events. The time-shift pointer may be used to designate a period within the buffering period of the disc transmitting the first television during which the time-shift event was detected. The time-shift pointers may be individually assigned or otherwise cross-referenced with the output device responsible for triggering the corresponding time-shift event. The number of time-shift points assigned to each output device may be limited to a predefined number (e.g., five or some other number based on system capabilities or subscription rates). In the event the predefined number of time-shift pointers is exceeded, the oldest of the time-shift points may be erased and replaced with a newer point, which can be useful if the output device is periodically scanning through different television channels.

Block 52 relates to determining a time-shift playback request. The time-shift playback request may generally correspond with a request to playback some portion of the buffered signaling, referred to as a time-shifted portion, occurring at some point in time before the portion of the program currently being transmitted over the first television channel. In the event no such request is received, the first television channel continuous to be transmitted and pointers continue to be assigned until one or more time-shift playback requests are received from one or more of the output devices. The time-shift playback request may correspond with a request to pause, rewind, fast forward, or slow motion play the television program.

Block 54 relates to retrieving the time-shift pointer associated with the time-shift playback request. It may be assumed that the currently tuned to television channel is the television channel for which time-shifted playback is desired. Optionally, the user may input the desired television channel in the event it is not desirable to assume the currently tuned to channel is the television channel desired for time-shifted playback. The time-shift pointer of the tuned to channel or inputted channel may then be retrieved according to identifying information in the time-shift playback request. Alternatively, as the last time-shift pointer assigned to the desired television for the requesting output device may be retrieved. In the event of multiple time-shift pointers are assigned to the same television channel for the same output device, an option may be provided for the user to select the desired pointer (such as by displaying an image frame of the television channel occurring at each of the time-shift pointers).

Block 56 relates to assessing whether the buffer of the television channel desired to time-shifted playback is still buffering the signaling associated with the retrieved time-shift pointer. As shown above in FIGS. 2a-2b, the buffering period may be limited to a predefined amount of signaling such that older signaling is eventually lost or moved to permanent memory after a predefined period of time. In the event sufficient signaling is available, a second television channel, or other type of signaling stream, is constructed in Block 60 to facilitate viewing of a time-shifted portion of the buffered content. The signaling transmitted over the second television channel may be transmitted according to a function specified in the time-shift playback request.

In the case of a rewind request, the signaling of the second television channel may begin at the period of time associated with the retrieved time-shift point and proceed with the disc reading the transmitted signal in an newest to oldest order such that the second television channel appears to be rewinding when output by the requesting output device. In the case of a fast forward request, the signaling of the second television channel may begin at the period of time associated with the retrieved time-shift point and proceed with the disc reading the transmitted signal in an accelerated, oldest to newest order such that the second television channel appears to be fast forwarding when output by the requesting output device. In the case of a slow play request, the signaling of the second television channel may begin at the period of time associated with the retrieved time-shift point and proceed with the disc reading the transmitted signal in an oldest to newest order at a slower rate such that the second television channel appears to be slow playing when output by the requesting output device. In the case of a pause request, the signaling of the second television channel may continuously transmit signaling sufficient to present a still image or frame corresponding in time with the retrieved pointer and/or instructions to the output device to simply maintain display of the frame so that the continuous signaling need not be sent. In the case of a play request, the signaling of the second television channel may begin at the period of time associated with the retrieved time-shift point and proceed with the disc reading the transmitted signal in an oldest to newest order such that the second television channel appears to be fast forwarding when output by the requesting output device. Because the signaling transmitted in the second television channel is ordered according to the corresponding time-shift playback request, the output device need not include capabilities to pause, rewind, fast forward, or slow motion play the signaling.

Block 62 relates to automatically tuning the output device away from the currently tuned to channel to the second television channel having the time-shift playback signaling. The tuning operation may be transparent to the user in that the user is not required to change channels or to otherwise identify the location of the second television channel.

Block 64 realest to assessing whether the time-shifted playback has exceed the oldest content available within the buffering period of the disc. This may occur, for example, if the user continues to desire rewinding beyond the capacity of the buffer. In the event the time-shifted playback has not exceed the oldest content available, an assessment is made in Block 66 as to whether the playback has exceed the newest available content. This may occur, for example, if the user continues to desire fast forwarding beyond the capacity of the buffer, i.e., to a point in time ahead of the signaling being reviewed from the source. In the event the newest content is exceed, the requesting output device is automatically tuned back to the first television channel, or the other channel lastly tuned to, in Block 68 and transmission over the second television channel cease. In the event the newest content is not exceed, Block 62 is returned to the output device continues to tune to the second television channel.

In the event the oldest content is exceeded in Block 64 or the time-shift buffer retrieved in Block 54 marked a period of time older than the oldest content, an assessment is made in block 72 as to whether the content is available from another disc or more permanent memory. Optionally, the expired buffered content, i.e., that exceeding the buffering period of the disc, may be automatically stored to permanent memory in the event at least one time-shift marker is assigned. The user may be required to specify permanent storage as part of the time-shift event triggering the corresponding marking in order to limit the amount of content being stored to permanent memory, such as to avoid continued storage associated with time-shift events triggered by tuning to new television channels. The content stored to the permanent memory may be associated with a particular subscriber, and optionally, inaccessible to other subscribers.

In the event the content is not available from the permanent memory, the oldest available content may be transmitted in the second television channel in Block 74 and the requesting output device tuned to the second television channel in Block 76. In the event the content is available from the permanent memory, the content may be transmitted from the permanent memory over the second television channel in Block 78 and automatically tuned to by the requesting output device in Block 80.

As supported above, one non-limiting aspect of the present invention relates to using a common time-shift buffer to implement a highly-scalable digital video recorder architecture. One non-limiting aspect of the present invention relates to recording of a single live video source to a single circular time-shift buffer. Multiple clients may be supported by file pointers into the time-shift buffer. The pointers may be used to allow for support of trick-mode for individual clients. The size of the buffer may be determined either by the client with the largest delay from the "live" position in the buffer (in which case the buffer grows) or by the maximum time-shift buffer size (in which case the lagging pointers may have to be adjusted). The architecture may be scaled by adding additional time-shift buffers as required by the maximum number of clients that can be supported per buffer.

Another non-limiting aspect of the present invention provides for efficient use of time-shift buffers in a shared network environment. In a home network environment, for example, this may allow multiple clients to have individual DVR functionality while watching the same source content. This architecture can be scaled to support multiple users in multiple households in a headend network-based architecture, providing cost savings through efficient resource usage in a shared DVR implementation.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating time-shifted playback of television signaling, the method comprising:
   circularly buffering television signaling to a single memory disc, the circular buffering characterized by temporarily storing the signaling on a first-in, first-out basis such that the buffered signaling is continuously replaced over time with newer television signaling;
   continuously transmitting the buffered first-in signaling in real-time to a plurality of output devices over a first signaling stream;
   associating a time-shift pointer with each time-shift event triggered by one of the plurality of output devices, each time-shift pointer identifying a period of time during which the time shift event occurred and the associated output device;
   upon determining a first time-shifted playback request from a first output device of the plurality of output devices, retrieving a first two or more time-shift pointers associated with the first output device;
   selecting one of the first two or more time shift pointers, and as a function thereof, determining a first time-shifted portion of the buffered signaling;
   transmitting the first time-shifted portion to the first output device, the first time-shifted portion being transmitted over a second signaling stream and beginning at a first period of time marked by the selected one of the first two or more time-shift pointers.

2. The method of claim 1 further comprising, upon determining a second time-shifted playback request, transmitting a second time-shifted portion of the buffered signaling to a second requesting one of the plurality of output devices, the second time-shifted portion being transmitted over a third signaling stream and beginning at a second period of time marked by a second time-shift pointer assigned to the second requesting one of the plurality of output devices.

3. The method of claim 1 further comprising reading the buffered signaling from the disc for each of the first and second signaling streams at different intervals.

4. The method of claim 3 further comprising reading the signaling from the disc with a single read head.

5. The method of claim 3 further comprising transmitting the buffered signaling during each non-overlapping interval at a faster rate than the output devices can output the signaling for viewing.

6. The method of claim 1 further comprising beginning transmission of the second signal stream after beginning transmission of the first signal stream and after determining the first time-shifted playback request.

7. The method of claim 1 further comprising, in the event the first time-shifted playback requests request forward playback, transmitting the television signaling of the second signaling stream such that the first time-shifted portion is read in an oldest to newest order beginning at the first period of time.

8. The method of claim 7 further comprising, in the event the forward playback request is a slow motion request, transmitting the first time-shifted portion at a slower speed.

9. The method of claim 1 further comprising, in the event the first time-shifted playback requests request reverse playback, transmitting the television signaling of the second signaling stream such that the first time-shifted portion is read in an newest to oldest order beginning at the first period of time.

10. The method of claim 1 further comprising, in the event the first time-shifted playback requests pausing playback, transmitting the television signaling of the second signaling stream such that the first time-shifted portion is limited to signaling sufficient to facilitate viewing of a still image occurring at the first period of time.

11. The method of claim 1 further comprising automatically switching the first requesting one of the plurality of output devices from the first signal stream to the second signaling stream after determining the first time-shifted playback request.

12. The method of claim 1 further comprising, in the event a second time-shift pointer is assigned to a second requesting one of the plurality of output devices to mark a second period of time and a second time-shift playback request is not determined before the second period of time exceeds a buffer length of the disc, transmitting a second time-shifted portion of the buffered signaling beginning at the second period of time marked by the second time-shift pointer to a second disc for permanent storage.

13. The method of claim 1 further comprising receiving the television signaling as a live television broadcast from a content source, buffering the television signaling at a headend of a television service provider, and transmitting the buffered television signaling to settop boxes (STBs) of subscribers associated with the television service provider, the STBs being the plurality of output devices being operable to tune to the first and second signaling streams.

14. The method of claim 1 further comprising:
   facilitating display of the first two or more time-shift pointers to a user of the first output device; and
   selecting the one or the first two more time-shift points as a function of user inputs received in response to display of the first two or more time-shift pointers.

15. A method of facilitating time-shifted playback of media content, the method comprising:
   buffering media content on a first-in, first-out basis such that the buffered media content is continuously replaced over time with newer television signaling once an amount of the buffered media content exceeds a buffer length;
   transmitting the buffered media content in real-time to a plurality of output devices over a first signaling stream;
   without correspondingly transmitting time-shifted portions of the buffered media content, assigning a plurality of time-shift pointers, one of the plurality time-shift being assigned for each time-shift event registered by the plurality of output devices, each time-shift pointer identifying a period of time during which the time shift event occurred; and
   subsequently, upon determining a first time-shifted playback request, transmitting a first time-shifted portion of the media content to at least a first requesting one of the plurality of output devices, the first time-shifted portion being transmitted over a second signaling stream and beginning at a first period of time marked by a first time-shift pointer selected from the plurality of time-shift pointers assigned to the first requesting one of the plurality of output devices.

16. The method of claim 15 further comprising buffering the media content to a single disc, reading the buffered media content from the disc for each of the first and second at non-overlapping intervals with a single read head, and transmitting the buffered media content during each non-overlapping interval at a faster rate than the output devices can output the media content.

17. The method off claim 15 further comprising, in the event a second time-shift pointer is assigned to a second requesting one of the plurality of output devices to mark a second period of time and a second time-shift playback request is not determined before the second period of time exceeds the buffer length, transmitting a second time-shifted portion of the buffered media content beginning at the second period of time marked by the second time-shift pointer for permanent storage.

\* \* \* \* \*